United States Patent [19]

Tsukamura et al.

[11] Patent Number: 4,925,717
[45] Date of Patent: May 15, 1990

[54] DISK-SHAPED RECORDING MEDIUM AND DISK APPARATUS

[75] Inventors: Yoshihiro Tsukamura, Kanagawa; Masataka Ogawa, Chiba; Seiji Kobayashi, Kanagawa, all of Japan

[73] Assignee: Sony Corporation, Tokyo, Japan

[21] Appl. No.: 348,486

[22] PCT Filed: Aug. 19, 1988

[86] PCT No.: PCT/JP88/00826
§ 371 Date: Apr. 18, 1989
§ 102(e) Date: Apr. 18, 1989

[87] PCT Pub. No.: WO89/01686
PCT Pub. Date: Feb. 23, 1989

[30] Foreign Application Priority Data

Aug. 21, 1987 [JP] Japan ............................ 62-207542
Dec. 22, 1987 [JP] Japan ............................ 62-322958

[51] Int. Cl.$^5$ ............................................. B32B 3/02
[52] U.S. Cl. ............................................. 428/64; 428/65; 428/209; 428/913; 369/288; 346/76 L; 346/135.1; 430/945
[58] Field of Search .................. 428/64, 65, 209, 913; 369/288; 346/76 L, 135.1; 430/945

[56] References Cited

U.S. PATENT DOCUMENTS 4,223,347 9/1980 Bouwhuis et al. .............. 346/135.1

FOREIGN PATENT DOCUMENTS 211346 12/1983 Japan .
292226 12/1986 Japan .

Primary Examiner—Patrick Ryan
Attorney, Agent, or Firm—Philip M. Shaw, Jr.

[57] ABSTRACT

A disk-like recording medium is provided with recording tracks (TK), each of which includes recording sectors ($SC_1$, $SC_2$, ..., $SC_m$). Each of the recording sectors includes a recording region ($AR_C$) for control and a subsequent region ($AR_D$) for writing data. The invention further deals with a disk apparatus using the disk-like recording medium. In the recording region ($AR_C$) for control of the disk-like recording medium are provided a clock data pit ($Q_B$), a pair of tracking data bit ($Q_A$, $Q_C$) positioned inside and outside a track center line ($K_C$) being separated at a predetermined distance from the clock data pit ($Q_B$), and a pair of traverse data pits ($Q_D, Q_E$) being separated from each other at a distance allotted depending upon the recording tracks (TK). In recording or reproducing the data using a light beam, the clocks are reliably reproduced under a stable tracking condition, and traverses can be counted.

6 Claims, 9 Drawing Sheets

RECORDING FORMAT OF OPTICAL DISK

RECORDING FORMAT OF OPTICAL DISK

RECORDING STATE OF CONTROL RECORDING REGION

FIG. 3  CONSTRUCTION OF A DISK RECORDING/REPRODUCING APPARATUS

TRACKING ERROR DETECTION CIRCUIT

RECORDING FORMAT OF OPTICAL DISK

RECORDING STATE OF CONTROL RECORDING REGION

DISK-SHAPED RECORDING MEDIUM AND DISK APPARATUS

TECHNICAL FIELD

This invention relates to a disk-shaped, recording medium in which recording tracks forming a large number of concentric turns are formed on an annular recording surface section for surrounding a central hole formed in said annular recording surface section, each of said turns of said recording tracks including a predetermined number of recording regions, corresponding ones of said recording regions among said turns of said recording tracks being arrayed in the radial direction of the recording surface section, each of said recording sections including a control recording region and an information writing region consecutive thereto, and a disk apparatus employing the disk shaped recording medium.

BACKGROUND OF ART

Recently, disk-shaped recording media, such as the optical disks or magneto-optical disks employing the optical or magneto-optical signal recording/reproducing method, have been evolved, and are being offered to the market. As these disk-shaped recording media, there are known the recording media of the read only memory (ROM) type, such as the so-called compact disk (CD), the recording media of the so-called write once type in which data writing is feasible only once by the user, and the recording media in which the data rewriting (so-called overwriting) is possible, such as the magneto-optical disk. As one of the techniques for realizing a unified recording format for these various recording media, there is proposed a so-called sampled servo technique in which, similarly to the so-called sector servo in a hard disk in the field of the magnetic disk, servo signals are recorded previously on the spiral or concentric tracks at predetermined intervals or angles (so-called preformating), these discrete signals being sampled and held at the time of the rotative driving of the disk to effect continuous servo control. As this kind of the disk-shaped recording medium, there is known to data an optical disk d shown for example in FIG. 9. Wherein clock information pits arranged on a track center line, a pair of tracking information pits spaced by a predetermined distance from said clock information pits and positioned on the inner and outer sides of said track center line and pairs of traverse information pits spaced by a distance allocated to each of said recording tracks and arranged on said track center line, are provided tracks tk, is mounted on a recording/reproducing device and rotated in the direction of an arrow mark r for information recording or reproduction employing the optical beam.

Each of the sectors $SC_1$, $SC_2$, ... $SC_m$ in each circular track is provided at towards its incipient side with an address information section ad followed by a predetermined number n of blocks $bl_1$, $bl_2$, ... , $bl_n$, (where n=43, as an example). As far as the blocks $bl_1$, $bl_2$, ... , $bl_n$ are concerned a plurality of registering blocks among the sectors, such as the block $bl_1$ among the sectors $SC_1$, $SC_2$, ... $SC_m$, are aligned in the radial direction of this optical disk d. Each of the blocks $bl_1$, $bl_2$, ..., $bl_n$ of each of the sectors $SC_1$, $SC_2$, ..., $SC_m$ is provided towards its incipient end with a control recording area $ar_C$, following by an information writing -area $ar_D$ to constitute a unit information division. In the control recording area $ar_C$ of each of the blocks $bl_1$, $bl_2$, ... , $bl_n$, tracking information pits $q_a$ and $q_b$, positioned on the outer and inner sides of a track center line $k_c$, and a clock information pit $q_c$, positioned on the track center line $k_c$, are formed in advance along the center line $k_c$ with a predetermined distance from one another. Referring to the array on the disk of the information pits $q_a$, $q_b$ and the clock information pits $q_c$ in a direction orthogonal to the track centerline $k_c$, that is, the radial direction of the optical disk d, the track information pits $q_b$ and the clock information pits $q_c$ are arrayed radially each on a straight line, whereas the track information pits $q_a$ are arrayed so that these pits are shifted in the longitudinal direction of the track $t_k$ at intervals of, for example, 16 consecutive tracks. When the optical disk d, provided in each control recording area $ar_c$ thereof with the tracking information pits $q_a$ and $q_b$ and the clock information pit $q_c$, is mounted on the recording-/reproducing apparatus for information recording or reproduction by an optical beam, the tracking information pits $q_a$, $q_b$ and the clock information pit $q_c$ of the control recording area $ar_C$ are read by the optical beam, with the tracking information pit $q_a$ being sampled by a sampling pulse $SP_1$ or $SP_2$, the tracking information pit $q_a$ being sampled by a sampling pulse $SP_3$, the clock information pit $q_c$ being sampled by the sampling pulse $SP_5$ and the mirror surface area between the tracking information pit $q_b$ and the clock information pit $q_c$ being sampled by the sampling pulse $SP_4$ so as to be utilized for servicing in various ways or for clock generation. Thus the clocks are regenerated from reproducing outputs of the clock information pits $q_c$ to generate the necessary timing clock while the tracking error is found on the basis of the reproducing output of the tracking information pits $q_a$ and $q_b$ positioned on the outer and inner sides of the track center line $k_c$ to effect tracking control or to effect focusing control on the basis of the reproducing output of the mirror surface region. The reproducing outputs of the tracking information pits $q_a$, arranged with a shift at intervals of 16 consecutive tracks, as described hereinabove, are utilized to perform a so-called traverse count to find the number of the tracks being scanned by the optical pickup.

It will be noted that the tracking information pits $q_a$, $q_b$ and the clock information pits $q_c$, preformated on the optical disk d as described hereinabove, are formed as physical projections and recesses which, in the actual optical disk, are thermally transferred to a disk base plate by a stamper.

When injection molding the disk substrate, on which the tracking information pits $q_a$ and $q_b$ and the clock information pits $q_c$, preformated on the optical disk d as described above, are previously thermally transferred by the above stamper, it may occur that so-called ghost pits are locally generated, such as by thermal shrinkage of the disk substrate, along the radial direction of the disk. Hence, in the conventional optical disk d in which the tracking information pits $q_a$ are shifted at intervals of 16 consecutive tracks, so as to be useful in the traverse counting, there is the risk that the reproducing output of the track information pits $q_a$ is affected by the ghost pits and cannot be used for proper detection of the tracking error resulting in unstable clock reproduction due to mistracking. Also, in the above described optical disk d, the array of the tracking information pits $q_a$ in which the tracking information pits $q_a$ are shifted in their positions at intervals of 16 consecutive tracks so as to be useful in traverse counting, it is only possible to perform traverse counting at intervals of 16 tracks, that is, R rough traverse counting, while it is not possible to perform a more precise traverse counting at intervals of one track.

In view of the above described convenience of the prior art system, the present invention provides a disk-shaped recording medium in which recording tracks forming a large number of circular turns are formed on an annular recording surface section for surrounding a central hole formed in said annular recording surface section, each of said turns of said recording tracks including a predetermined number of recording regions, corresponding ones of said recording regions among said turns of said recording tracks being arrayed in the radial direction of the recording surface section, each of said recording sections including a control recording region and an information writing region consecutive thereto, and a disk apparatus employing the above disk-shaped recording medium, wherein clocks may be reproduced reliably under stable tracking control and traverse counting of the recording tracks may be performed with high accuracy on the track-by-track basis.

DISCLOSURE OF THE INVENTION

In order to obviate the above inconveniences, the present invention provides a disk-shaped recording medium in which recording tracks forming a large number of circular turns are formed on an annular recording surface section for surrounding a central hole formed in said annular recording surface section, each of said turns of said recording tracks including a predetermined number of recording regions, corresponding ones of said recording regions of said turns of said recording tracks being arrayed in the radial direction of the recording surface section, each of said recording sections including a control recording region and an information writing region consecutive thereto, characterized in that clock information pits arranged on a track center line, pairs of tracking information pits each being spaced by a predetermined distance from said clock information pits and positioned on the inner and outer sides of said track center line and pairs of traverse information pits each being spaced by a distance allocated to each of said recording tracks and arranged on said track center line, are provided in said control recording region.

In the disk-shaped recording medium according to the present invention, the clock information is afforded by clock information pits arranged on the track center line, the tracking information is afforded by paired tracking information pits spaced a predetermined distance from the clock information pits and positioned on the inner and the outer sides of the track center line and the traverse count information for the recording tracks on the track-by-track basis is afforded by paired traverse information pits on the track center line with a spacing by a distance allocated for each recording track.

According to the present invention, there is also provided a disk apparatus for recording/reproducing the information using a disk-shaped recording medium in which recording tracks forming a large number of circular turns are formed on an annular recording surface section for surrounding a central hole formed in said annular recording surface section, each of said turns of said recording tracks including a predetermined number of recording regions, corresponding ones of said recording regions of said turns of said recording tracks being arrayed in the radial direction of the recording surface section, each of said recording sections including a control recording region and an information writing region consecutive thereto, wherein clock information pits arranged on a track center line, a pair of tracking information pits spaced by a predetermined distance from said clock information pits and positioned on the inner and outer sides of said track center line and a pair of traverse information pits spaced by a distance allocated to each of said recording tracks and arranged on said track center line, are provided in said control recording region, characterized in that the disk apparatus comprises an optical head for reading out said clock information pits, tracking information pits and said traverse information pits, tracking control means for performing tracking control of said optical head relative to said recording track on the basis of the track information of said track information pits read out by said optical head, clock reproducing means for reproducing clocks from the clock information of said clock information pits read out by said optical head under tracking control by said tracking control means, and traverse counting means for reading out the bit pattern of said paired traverse information pits read out by said optical head on the basis of the reproducing clocks reproduced by said clock reproducing means to effect traverse counting of said recording tracks.

In the disk apparatus of the present invention, it is possible to perform a reliable clock regeneration under stable tracking state on the basis of the respective information derived from the clock information pits, tracking information pits and the traverse information pits read out from the disk-shaped recording medium by the optical head, while it is possible to perform the traverse counting for the recording tracks on the track-by-track basis.

BEST FORM OF PRACTICING THE INVENTION

Figure 1:
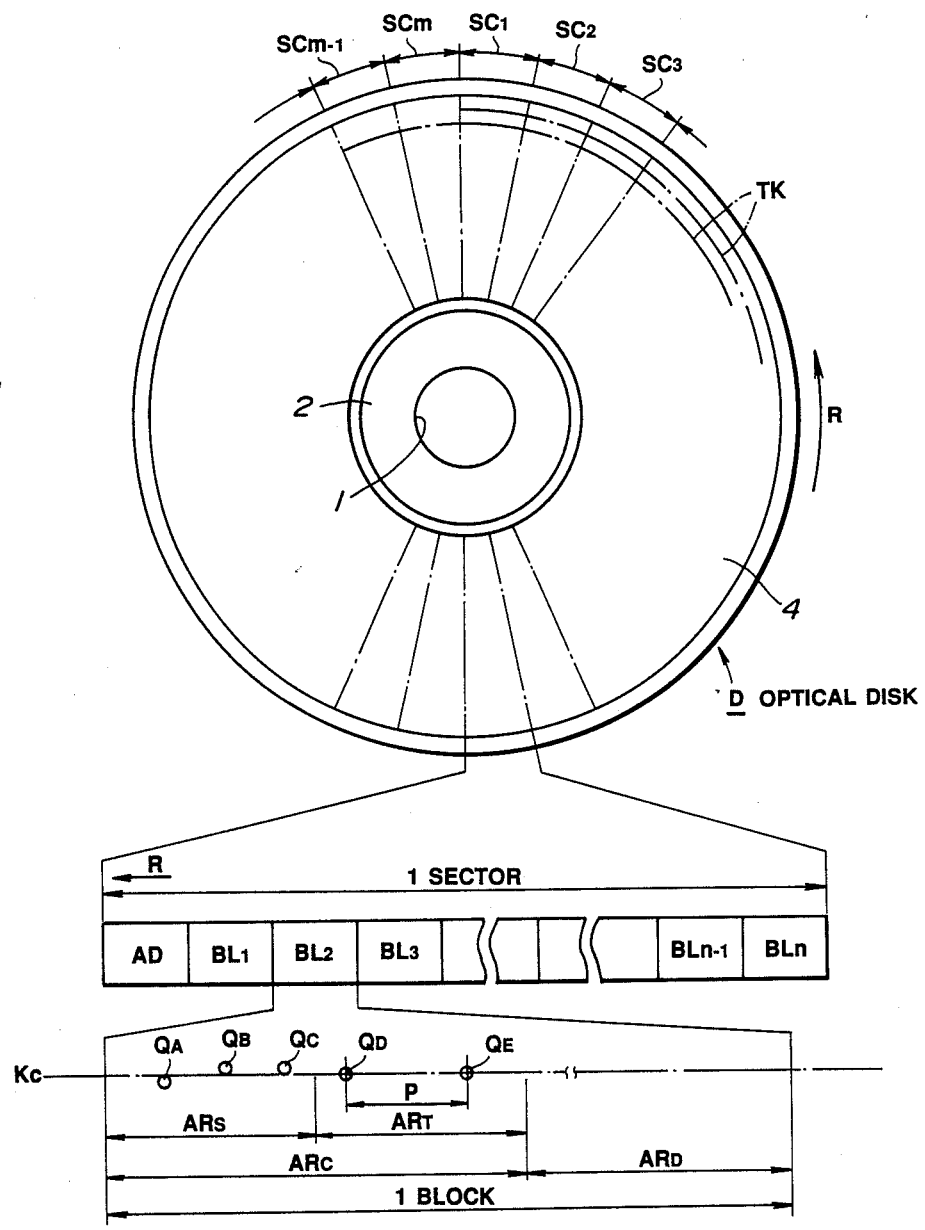
FIG. 1 is a diagrammatic view showing a recording format of the optical disk as an embodiment of the disk-shaped recording medium according to the present invention.
Figure 2:
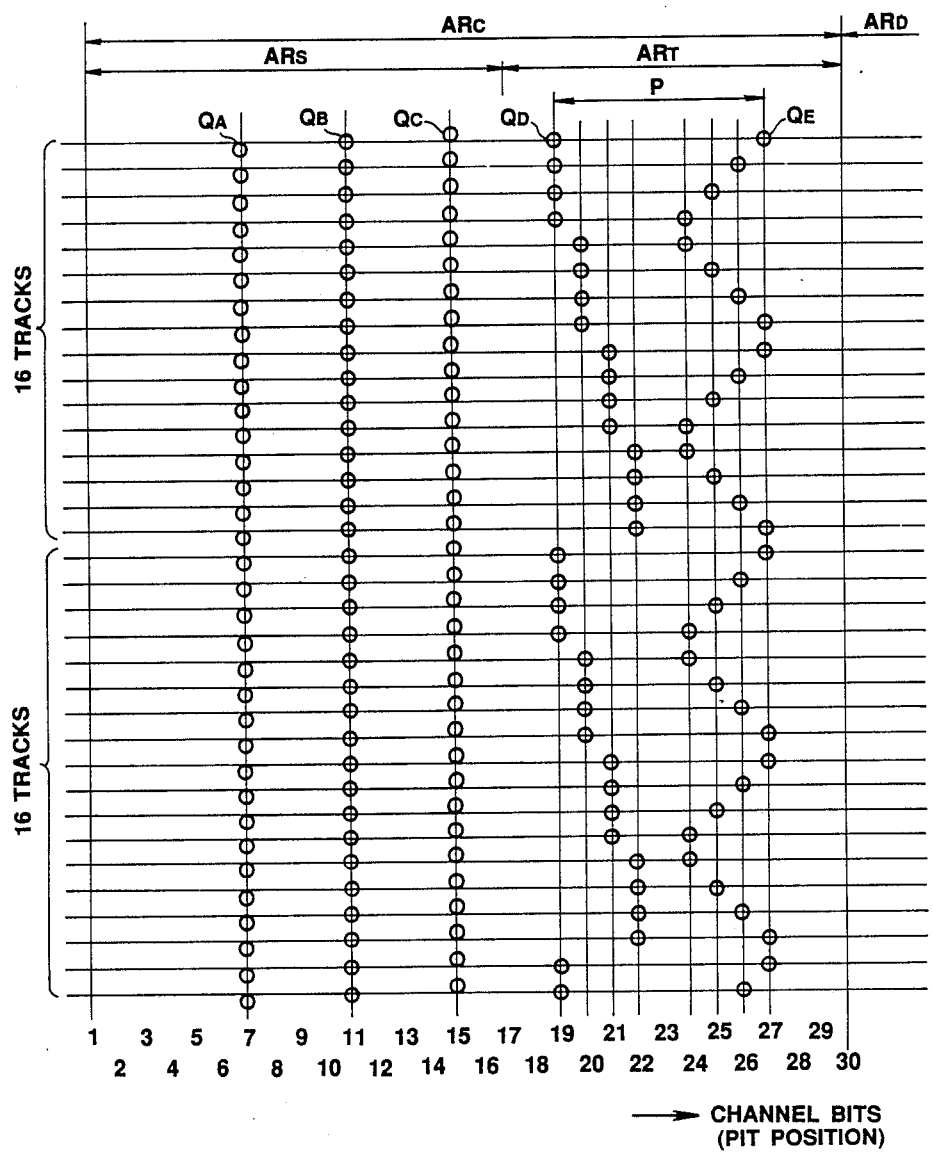
FIG. 2 is a diagrammatic view showing the state of each information pit provided in the control recording region of the optical disk.

An embodiment of the present invention will be explained hereinafter by referring to the drawings.

Figure 9:
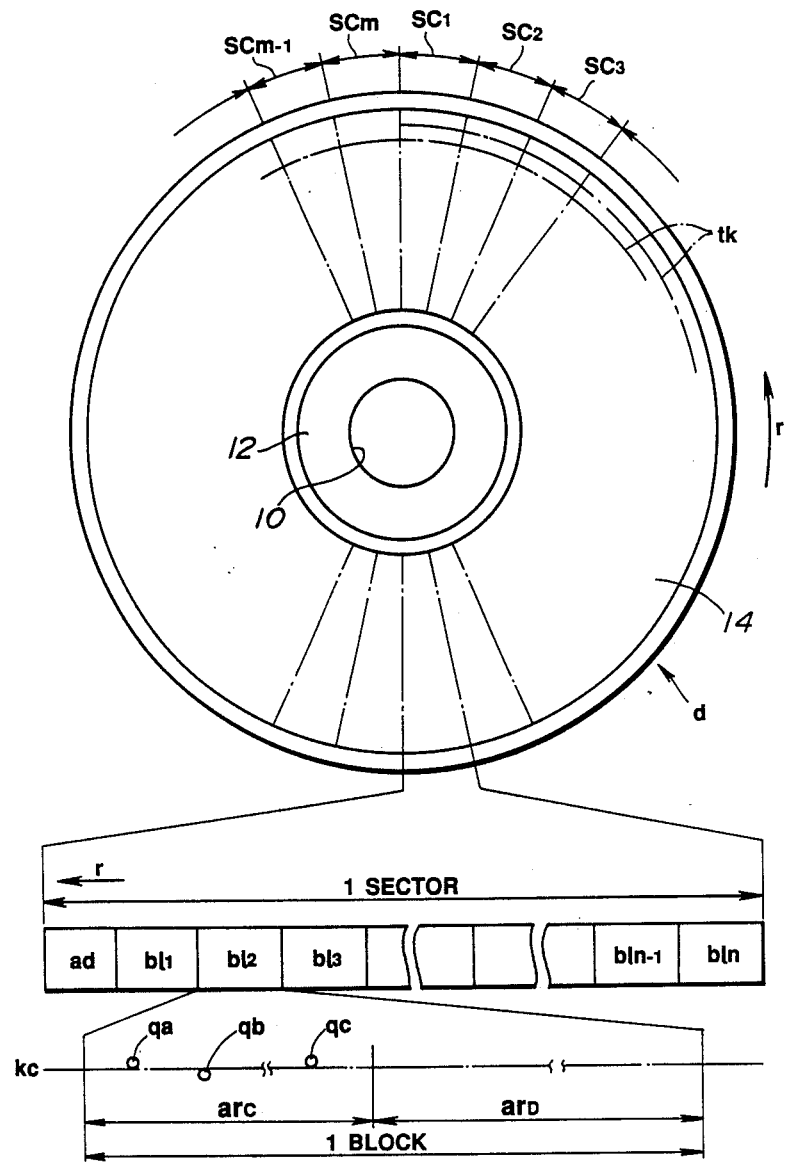
FIG. 9 is a diagrammatic view showing the recording format of the conventional optical disk.
Figure 10:
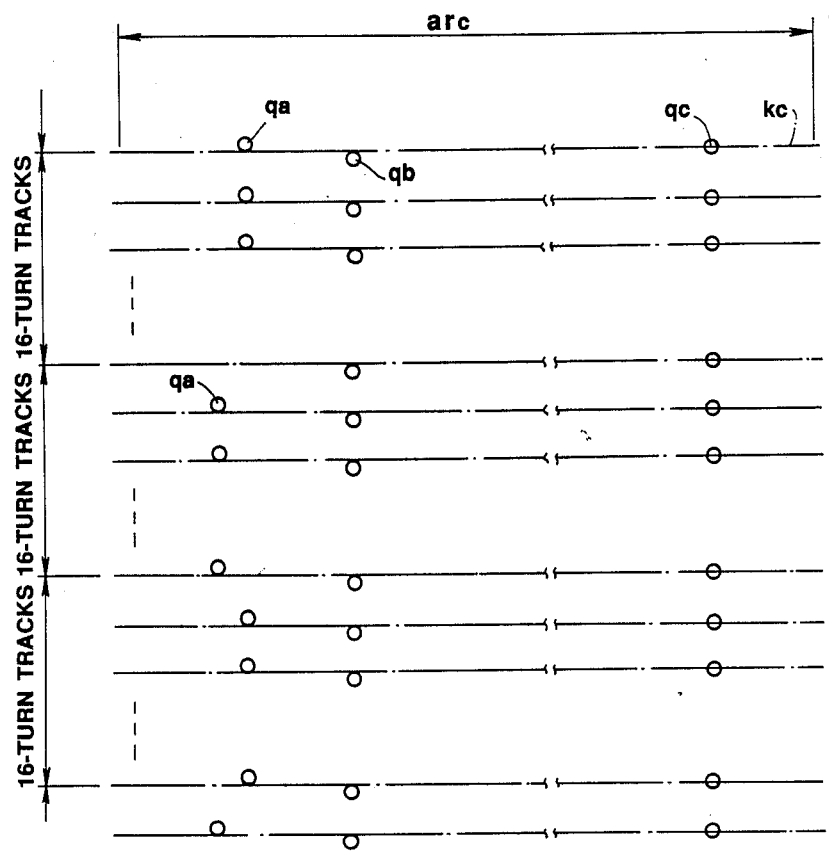
FIG. 10 is a diagrammatic view showing the state of each pit provided in the control recording region of the optical disk.

In an optical disk D, shown in FIG. 1, an annular label section 2 is provided about a central hole 1, as in the conventional disk d shown in FIG. 9, and an annular recording surface section 4 is provided around the label section 2. On the section 4, there is provided a spirally extending recording track TK forming a pattern of a large number of circular or substantially concentric turns surrounding the central hole 1. Each turn or each circular track is divided into a predetermined number m of sectors $SC_1$, $SC_2$, ..., $SC_m$ (where m=32, as an example). A plurality of registering sectors among the circular tracks, such as the sectors $SC_1$ of the tracks, are aligned in the radial direction of the optical disk D. Each of the sectors $SC_1$, $SC_2$, ... $SC_m$ in each circular track is provided at towards its incipient side with an address information section AD followed by a predetermined number n of blocks $BL_1$, $BL_2$, ..., $BL_n$, (where n=43, as an example). As far as the blocks $BL_1$, $BL_2$, ..., $BL_n$, a plurality of registering blocks among the sectors, such as the block $BL_1$ among the sectors $SC_1$, $SC_2$, ... $SC_m$, are aligned in the radial direction of this optical disk d. Each of the blocks $BL_1$, $BL_2$, ..., $BL_n$ of each of the sectors $SC_1$, $SC_2$, ... $SC_m$ is provided towards its incipient end with a control recording area $AR_C$, followed by an information writing area $AR_D$ to constitute a unit information division.

The control recording region $AR_C$ of each of the blocks $BL_1$, $BL_2$, ..., $BL_n$ is divided into a servo region $AR_S$ and a traverse region ART. In the servo region $AR_S$, a pair of tracking information pits $Q_A$ and $Q_C$ are provided with a shift towards the outside and the inside on both sides of a track center line $K_C$ with a spacing of a predetermined interval along the track direction, while a clock information pit $Q_B$ is provided on the track center line $K_C$ at a position intermediate between the tracking information pits $Q_A$ and $Q_C$ On the traverse region ART, a pair of traverse information pits $Q_D$, $Q_E$ are provided at an interval from each other of a distance P allotted for each recording track with the clock information pit $Q_B$ as the reference.

In the present embodiment, each control recording region $AR_C$ has a data recording capacity of 30 channel bits. The 7th and 11th channel bits are allocated as the recording positions of the tracking information pits $Q_A$ and $Q_C$ and the 11th channel bit is allocated as the recording position of the clock information pit $Q_B$, while the 19th and the 27th channel bits are allocated as the recording regions of the traverse information pits $Q_D$ and $Q_E$. Referring to the direction of the tracking information pits $Q_A$, $Q_C$, clock information pits $Q_B$ and the traverse information pits $Q_D$, $Q_E$ orthogonal to the track center line $K_C$, that is, the radial direction of the optical disk D, the tracking information pits $Q_A$ and $Q_C$ and the clock information pits $Q_B$ are arrayed on respective straight line along the radial direction, whereas the traverse information pits $Q_D$ are shifted in their positions in the track direction by one channel bit at intervals of four consecutive tracks, whereas the other traverse information pits $Q_E$ are shifted in their positions by one channel bit for each track, except the portions where the traverse information pits $Q_D$ are being changed in their positions at intervals of four consecutive tracks, such that the bit pattern differs on the track-by-track basis with the 16 consecutive tracks as a recurrent unit.

In the present embodiment in which the control recording region $AR_C$ of each of the blocks $BL_1$, $BL_2$, ..., $BL_n$ is divided into a servo region $AR_S$ and a traverse region ART and in which the tracking information pits $Q_A$, $Q_C$ and the clock information pits $Q_B$ are arrayed on respective straight radial lines in the servo region $AR_S$, even when the so-called ghost pits are locally produced in the radial direction of the disk due to thermal contraction or the like of the disk substrate at the time of injection molding of the disk substrate on which the tracking information pits $Q_A$, $Q_C$ and the clock information pits $Q_B$ are transferred thermally, there is no risk that the reproducing output of the tracking information pits $Q_A$ and $Q_C$ or the clock information pits $Q_B$ should become unstable, under the effect of the ghost pits, in the disk apparatus adapted for reproducing the recording and/or reproduction of the information using this optical disk D, such that clock degeneration or reproduction may be achieved reliably from the clock information pits $Q_B$ on the basis of the tracking information pits $Q_A$, $Q_C$ under stable tracking control. In the optical disk D of the present embodiment, since the clock information pits $Q_B$ are placed intermediate between the tracking information pits $Q_A$ and $Q_C$, the deviating scanning of the light beam for reading out the information may be facilitated. In addition, the relative distance P between the traverse information pits $Q_D$ and $Q_E$ provided in the traverse region ART is changed by one channel bit between adjacent tracks, and one of the paired traverse information pits $Q_D$ and $Q_E$ is at the same position, so that the read-out errors at the time of reading out the traverse information by the traverse information pits $Q_D$ and $Q_E$ may be identified easily, such that the bit patterns of the paired traverse information pits $Q_D$ and $Q_E$ may be read out on the basis of the reproducing clocks obtained from the above clock information pits $Q_B$ under the stable tracking control on the basis of the above tracking information pits $Q_B$.

Figure 3:
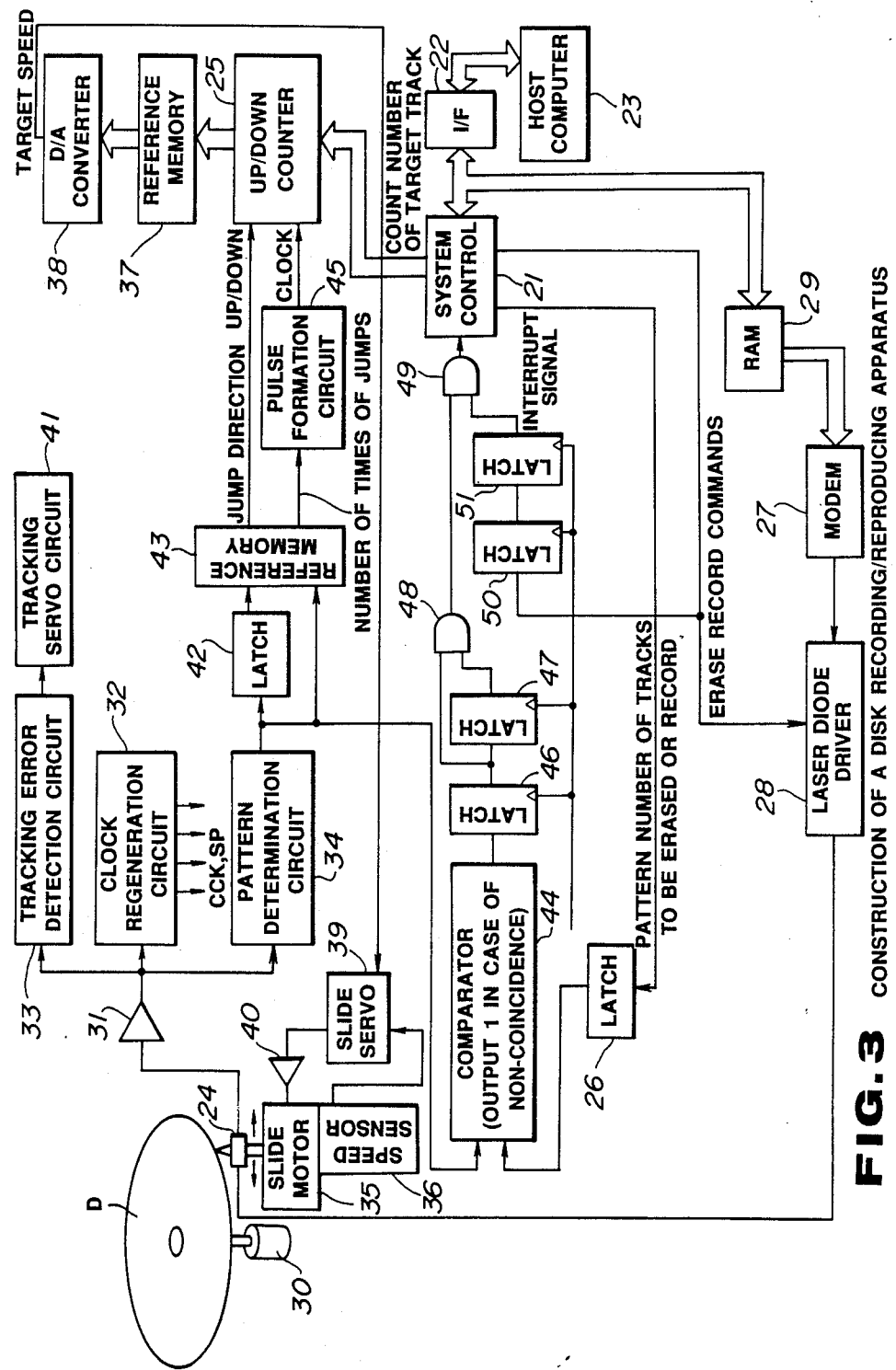
FIG. 3 is a block diagram showing an embodiment of the disk apparatus employing the above optical disk.

The above described optical disk D is employed as the disk-shaped recording medium for the disk apparatus arranged as shown for example in FIG. 3.

In the block diagram shown in FIG. 3, a system controller 21 is responsive to the control instructions supplied from a host computer 23 connected via an interfacing circuit 22 to control the operation of the apparatus in its entirety. Thus it supplies to an up/down counter 25 preset data indicating the number of the tracks up to a target track for performing a seeking control of an optical head 24 adapted for recording/reproducing the information on the optical disk D, while supplying to a latch circuit 26 the bit pattern data of the aforementioned traverse information pits $Q_D$, $Q_E$ previously recorded on the tracks to be erased or recorded, and also supplying erasure or recording instruction signals to a record data demodulating circuit 27 and to a laser driving circuit 28.

During the erasure mode operation, the modulating circuit 27 supplies erasure pulses to the laser drive circuit 28 at the timing conforming to the reference channel clocks CCK. During the recording mode operation, the circuit 27 subjects the recording data written from the host computer 23 via interfacing circuit 22 into a memory 29 to a predetermined modulation, such as EFM (eight-fourteen modulation) to supply the modulated recording data pulses timed with the above channel clocks CCK to the laser driving circuit 28. This laser driving circuit 28 drives a laser diode, not shown, enclosed in the optical head 24, by drive pulse signals conforming to recording data pulses during the record mode operation or erasure pulses during the erasure mode operation. During the reproducing operation mode, other than the erasure and recording operation modes, the circuit 28 supplies to the laser diode the high frequency signals adapted for high frequency driving the laser diode with a lower light volume for reproducing the information for the optical disk D.

It will be noted that the optical disk D is rotated accurately by a disk motor 30 at a constant angular velocity.

The optical head 24 has enclosed therein a laser diode driven by the laser drive circuit 28 to output a laser light for information recording and/or reproduction, a photodetector for detecting the laser light irradiated on the disk D and reflected thereby, and the like, such that the photo-detector output, that is, the reproducing output, is supplied to a clock reproducing circuit 32, a tracking error detecting circuit and to a pattern detecting circuit 34, while being simultaneously supplied to a demodulating circuit for data reproduction, not shown. This optical head 24 is moved on the radius of the optical disk D by a slide motor 35, the driving speed of which is detected by a speed sensor 36. A motor driving circuit 40 is servo controlled by a slide servo circuit 39 on the basis of the speed detection signals sensed by the speed sensor 36 and the target speed signal converted by a digital to analog (D/A) converter 38 from the target speed data read out from a speed information reference memory 37 with the count output by the up/down counter 55 as the address.

Figure 4:
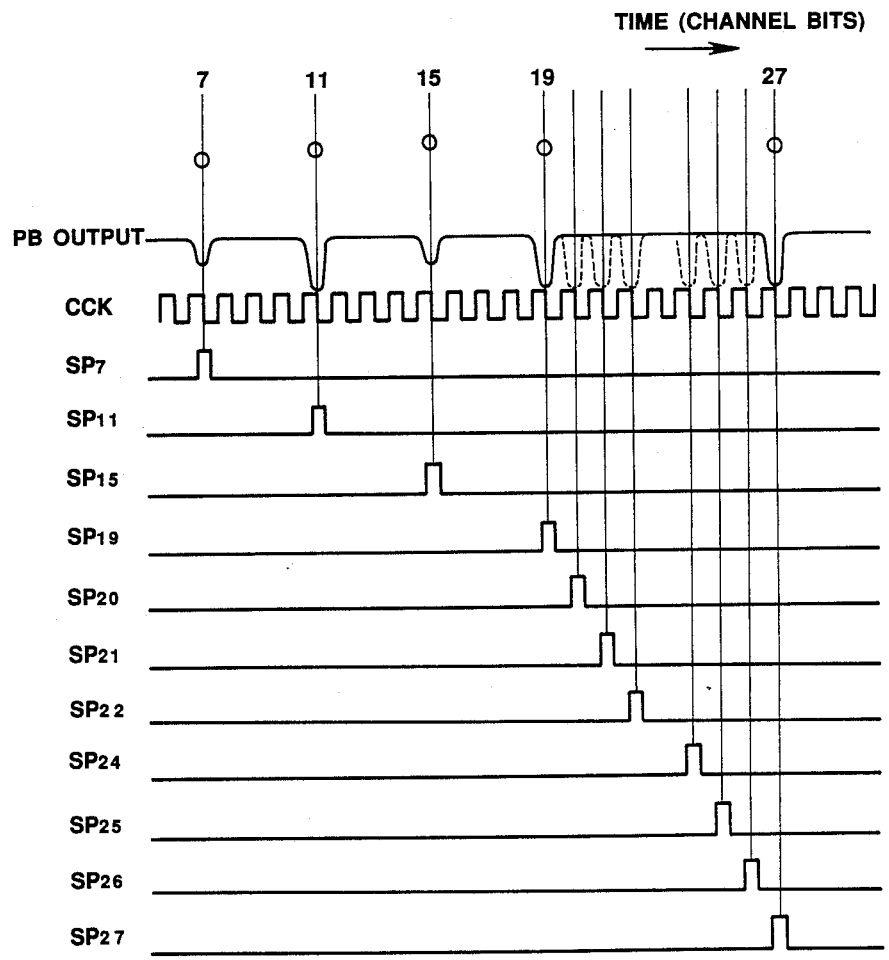
FIG. 4 is a timing chart showing the operation of the clock regenerating circuit constituting the disk apparatus.

The clock regenerating circuit 32 performs clock reproduction by a so-called phase locked loop (PLL), on the basis of the reproducing output by the clock information pits $Q_B$ in the reproducing output supplied from the optical head 24 via the preamplifier 31, for regenerating channel clocks CCK as shown in FIG. 4 and for various sampling pulses $SP_7$, $SP_{11}$, $SP_{15}$, $SP_{19}$, $SP_{20}$, $SP_{21}$, $SP_{22}$, $SP_{24}$, $SP_{25}$, $SP_{26}$ or $SP_{27}$ timed to the channel clocks CCK.

The tracking error detecting circuit 33 detects the tracking error, on the basis of by the tracking information pits $Q_A$, $Q_C$ in the reproducing output supplied from the optical head 24 via the preamplifier 31, for supplying the tracking error signals to a tracking servo circuit 41.

Figure 5:
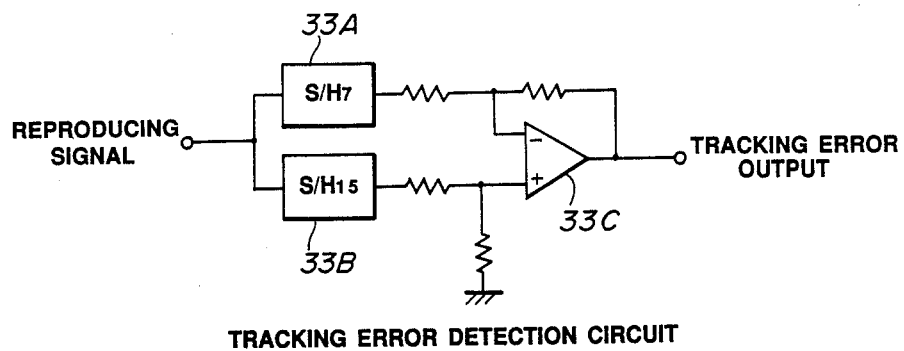
FIG. 5 is a circuit diagram showing a concrete constructional example of the tracking error detection circuit constituting the above disk apparatus.

The tracking error detecting circuit 33 is constituted by, for example, two sample-and-hold circuits 33A, 33B a differential amplifier 33C, etc., as shown in FIG. 5, and operates in such a manner that the reproducing output for the tracking information pits $Q_A$, $Q_C$ in the reproducing output is sampled and held by the sample-and-hold circuits 33A, 33B and the level difference in the sample-held output is detected by the differential amplifier 33C as the tracking error. The sample pulses $SP_7$, $SP_{15}$ formed in the clock regenerating circuit 33 are used for sampling and holding of the reproducing output for the tracking information pits $Q_A$, $Q_C$ by the sample-and-hold circuit 33A, 33B.

With respect to the reproducing output supplied from the optical head 24 via the preamplifier 31, the pattern discriminating circuit 34 discriminates the bit pattern of the traverse information pits $Q_D$, $Q_E$ and supplies the discrimination output data to a latch circuit 42, a reference memory 43 for the traverse information and to a comparator 44.

Figure 6:
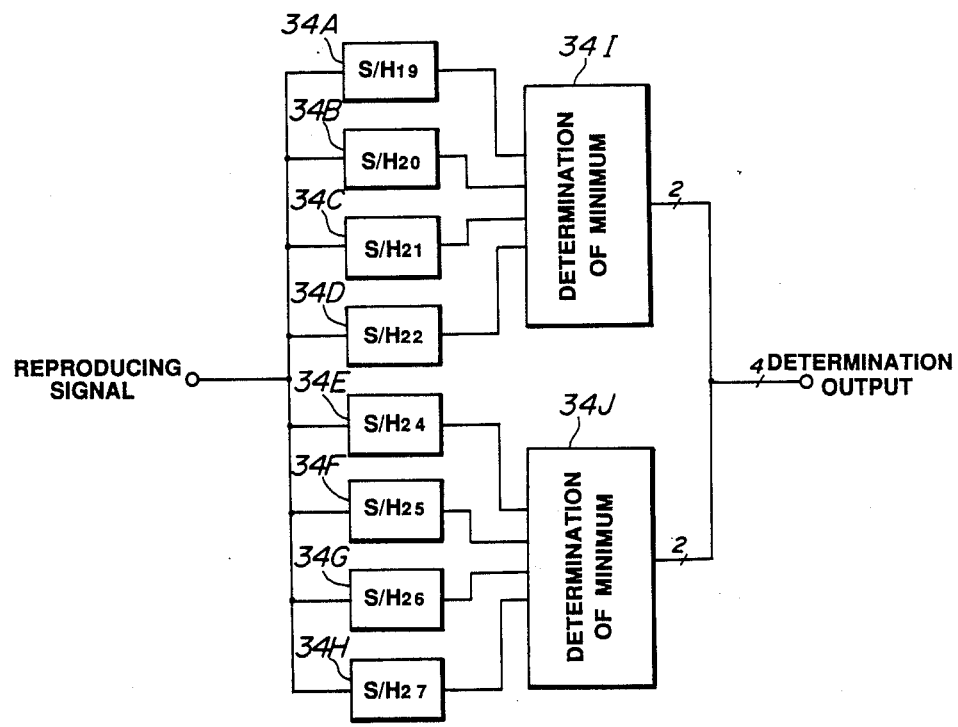
FIG. 6 is a block diagram showing the construction of a pattern discriminating circuit constituting the disk apparatus.

As shown for example in FIG. 6, the pattern discriminating circuit 34 is constituted by the eight sample-and-hold circuits 34A, 34B to 34H and two minimum value discriminating circuits 34I, 34J. The aforementioned eight sample-and-hold circuits 34A and 34B-34H sample and hold the reproducing output for the traverse region $AR_T$ of the optical disk D, using the sampling pulses $SP_{15}$, $SP_{19}$, $SP_{20}$, $SP_{21}$, $SP_{22}$, $SP_{24}$, $SP_{25}$, $SP_{26}$ and $SP_{27}$ formed in the clock regenerating circuit 32. The minimum value discriminating circuits 34I, 34J perform level comparison of the sample-held outputs by the sample-and-hold circuits 34I, 34J to form discrimination data indicating the bit pattern of the traverse information pits $Q_D$, $Q_E$, based on the bit timing of the sample-held reproducing outputs for the paired traverse information pits $Q_D$, $Q_E$ contained in the reproducing output from the aforementioned traverse region $AR_T$, that is, the sample-held outputs affording a minimum value.

In the reference memory 43 for the traverse information, there are stored the data concerning the number of tracks and the changing direction based on the trackwise bit patterns of the traverse information pits $Q_D$, $Q_E$ provided in the traverse region $AR_T$ of the optical disk D. From the reference memory 43, there are read out data indicating the number of track jumps and the direction of track jumps by the movement of the optical head 24, using the bit pattern data, before one servo block or before one track, that are given by the contents of the latch circuit 42 latching the discrimination output data obtained at the pattern discriminating circuit 34 and the bit pattern data given by the current discrimination output data obtained at the pattern discriminating circuit 34. The data indicating the track jump direction are supplied from the reference memory 43 to the up/down control input of the up/down counter 25 as the count control signals. The data indicating the number of track jumps are supplied from the reference memory 43 to a pulse producing circuit 45 where they are converted into clock pulses having a pulse number conforming to the number of track jumps, which clock pulses are then supplied to the clock input terminal of the up/down counter 25.

The up/down counter 25, in which are preset the data indicating the number of tracks up to the target track afforded by the system controller 21, counts up or counts down the clock pulses having a pulse number conforming to the number of track jumps by the shifting of the optical head 24, to apply to the speed information reference memory 37 the count output indicating the distance to the target track as the address data. The target speed data read out from the reference memory 37 are converted in the digital to analog (D/A) converter 38 into analog target speed signals which are then supplied to the slide servo circuit 39 to control the slide motor 35 to access the optical head 24. Upon terminating the accessing, that is, after the seeking of the optical head 24 to the target track position is terminated, the count value of the up/down counter 25 is reset to zero.

The comparator 44, to which the discriminating output is applied by the pattern discriminating circuit 34, compares the bit pattern data applied by the system controller 21 to the latch circuit 26 and the bit pattern data obtained as the discriminating output of the pattern discriminating circuit 34 and, when the two bit pattern data coincide with each other, outputs a coincidence signal having a logical value "0". The output of the comparator 34 is stored for each servo block by two cascaded latch circuits 46, 47 and a logical AND is taken at a first AND gate 48, the output of which is supplied to a second AND gate 49. The second AND gate 49 is supplied with a signal via two cascaded latch circuits 50 and 51 adapted to store erasure instruction signals or recording command signals outputted by the system controller 21 for each servo block. When the logical AND output by the first AND gate 48 indicating that noncoincidence of the pattern data has been detected for two consecutive servo-blocks during the erasure mode operation indicated by the erasure instruction signal or the recording command signal indicated by the recording command signal is supplied to the gate 49, it supplies an interrupt signal to the system controller 21.

When supplied from the second AND gate 49 with the interrupt signal, the system controller 21 cancels the erasure mode operation or the recording mode operation. When in the recording operation mode, the system controller searches for a substitution sector in the information writing region $AR_D$ of the optical disk D to restart the recording operation for this sector.

In the above described disk apparatus, the operation is canceled when the deviation from the target track occurs for two consecutive servo blocks in the erasure or record operation modes. However, the operation may be cancelled when there is detected the non-coincidence of the bit pattern data of the traverse information pits extending over three or more blocks.

A modified embodiment of the disk-shaped recording medium according to the present invention will be explained by referring to FIG. 7.

Figure 7:
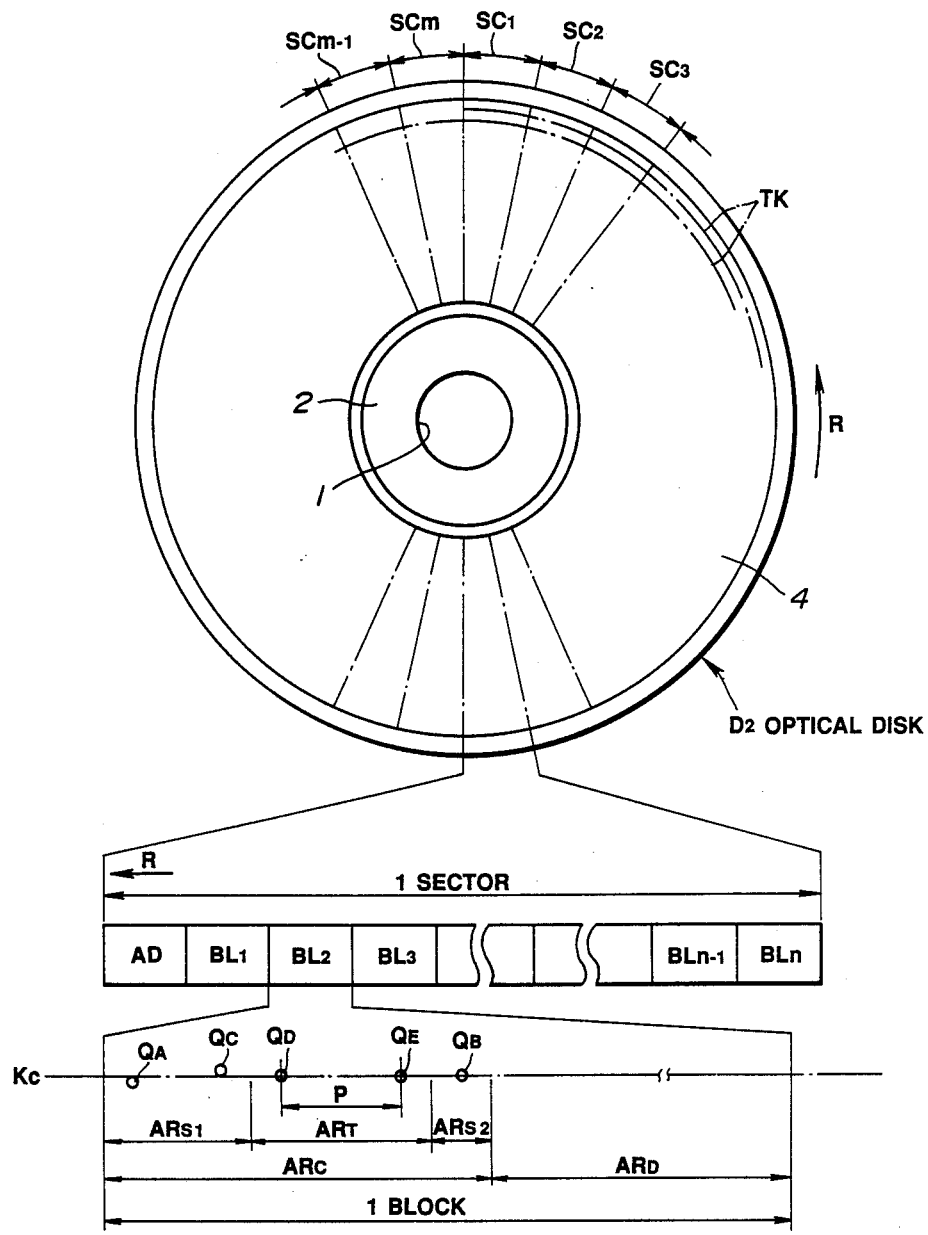
FIG. 7 is a diagrammatic view showing the recording format of the optical disk according to a modified embodiment of the disk-shaped recording medium according to the present invention.
Figure 8:
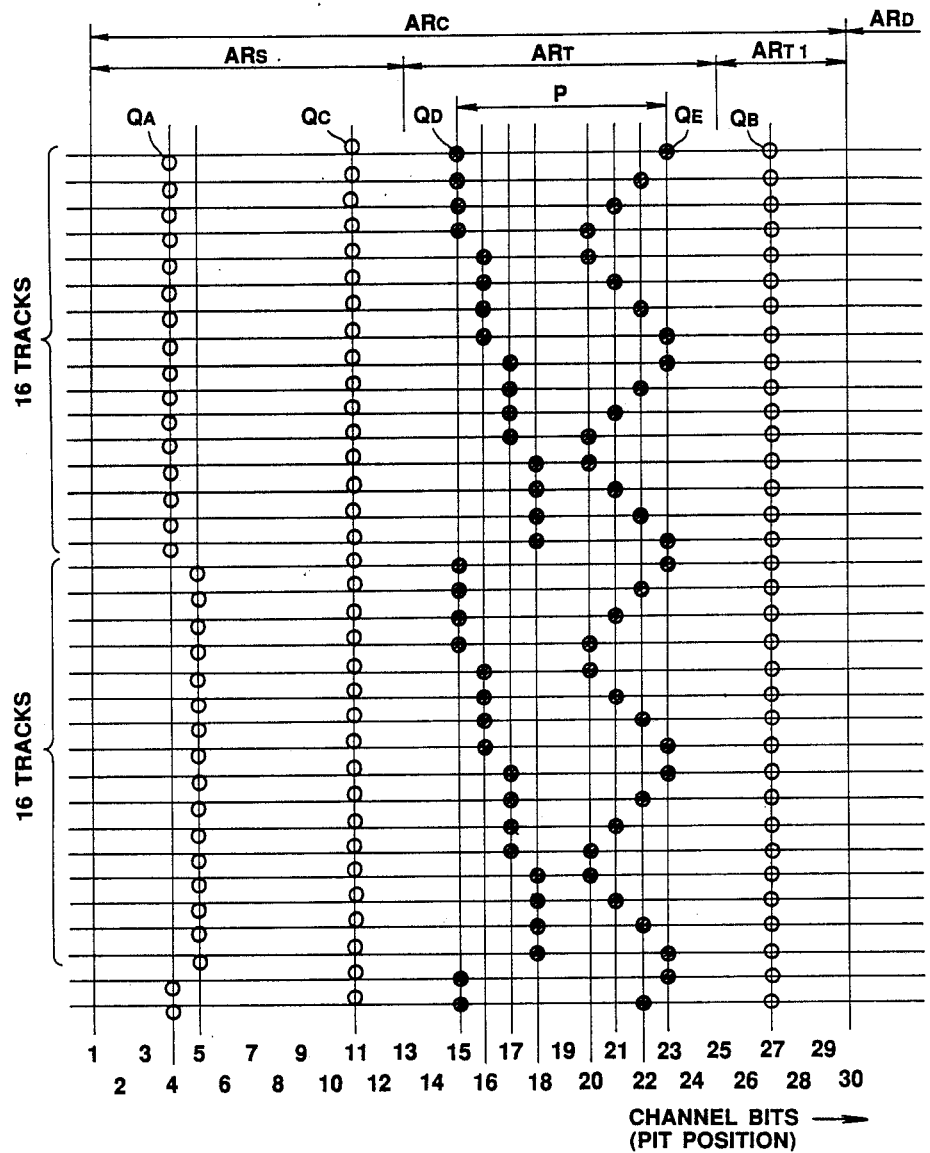
FIG. 8 is a diagrammatic view showing the state of each information pit provided in the control recording area of the optical disk.

The optical disk $D_2$ in the embodiment shown in FIG. 7 is provided with an annular label section 2 about the central hole 1, similarly to the optical disk D of the embodiment of FIG. 1, and an annular recording surface section 4 is provided for extending around this label section 2. In this recording surface section 4, there is provided a spirally extending recording track TK forming a pattern of a large number of circular or substantially concentric turns surrounding the central hole 1. Each turn or each circular track is divided into a predetermined number m of sectors $SC_1$, $SC_2$, ... $SC_m$, and a plurality of registering on corresponding sectors among the circular tracks are aligned in the radial direction. Each of these sectors $SC_1$, $SC_2$, ..., $SC_m$, is provided towards its incipient side with an address information section AD followed by a predetermined number n of blocks $BL_1$, $BL_2$, ..., $BL_n$ arrayed along the recording track TK. As far as the blocks $BL_1$, $BL_2$, ..., $BL_n$ are concerned, a plurality of registering blocks among the sectors are similarly arrayed along the radial direction of the optical disk D. Each of the blocks $BL_1$, $BL_2$, ..., $BL_n$ of each of these sectors $SC_1$, $SC_2$, ..., $SC_n$ is provided towards its incipient side with a control recording region $AR_C$ followed by an information writing region $AR_D$ to constitute a with information division.

The control recording region $AR_C$ of each of the blocks $BL_1$, $BL_2$ to $BL_n$ is divided into two servo regions $AR_{S1}$, $AR_{S2}$ and a traverse region $AR_T$.

In the first servo region $AR_{S1}$ of the control recording region $AR_C$, a pair of tracking information pits $Q_A$, $Q_C$ are previously recorded as the physical changes in profile in the form of projections and recesses at the outer and inner sides of the track centerline $K_C$ and at a predetermined spacing, herein six or seven channel bits, along the track direction. In the second servo region $AR_{S2}$ of the control recording region $AR_C$ of the control recording region $AR_C$, there is previously recorded a clock information pit $Q_B$ on the track center line $K_C$ in the form of physical changes in-profile by so-called embossing. In the above traverse region $AR_T$, there are photomagnetically recorded a pair of traverse information pits $Q_D$, $Q_E$ at a spacing P from each other which is allocated for each recording track with the clock information pit $Q_B$ as the reference.

In the present embodiment, each control recording region $AR_C$ has a data recording capacity of 30 channel bits. In the first servo region $AR_{S1}$, the 4th and 5th channel bits are allocated as the recording positions for the tracking information pits $Q_A$ alternately at interval of 16 consecutive tracks, while the 11th channel bits are allocated as the recording position for the other track information pit $Q_C$. In the second servo region $AR_{S2}$, the 27th channel bits are allocated as the recording position for the clock information pit $Q_B$. In the traverse region $AR_T$, the 15th to 23rd channel bits are allocated as the recording region for the traverse information pits $Q_D$, $Q_E$.

Referring to the arraying status on the optical disk D of the tracking information pits $Q_A$, $Q_C$, clock information pits $Q_B$ and the traverse information pits $Q_D$, $Q_E$ in a direction normal to the track center line $K_C$, or in the radial direction of the disk D, the tracking information pits $Q_C$ and the clock information pits $Q_B$ are radially arrayed along straight lines, whereas the tracking information pits $Q_A$ are shifted in the track direction by one channel bit at intervals of 16 consecutive tracks, the traverse information pits $Q_D$ among the traverse information pits $Q_D$, $Q_E$ are shifted in the track direction by one channel bit at intervals of four consecutive tracks and the other traverse information pits $Q_E$ are shifted by one channel bit at one track interval along the track direction except the portion at which the traverse information pits $Q_D$ are shifted at intervals of four consecutive tracks, such that the pit pattern is changed cyclically with 16 bits as one period and the pit position differs for each track.

In the optical disk of the present embodiment, rough traverse information is afforded, with 16 tracks as one unit, by the above tracking information pits $Q_A$ that are shifted by one channel bit at intervals of 16 consecutive blocks in the track direction. The traverse information pits $Q_D$, $Q_E$ afford the traverse information indicating each track of the 16 consecutive blocks of one period on the track-by-track basis.

When the traverse information pits $Q_D$, $Q_E$ of the traverse region $AR_T$ are recorded photo-magnetically, as in the present embodiment, the relative distance P between the traverse information pits $Q_D$, $Q_E$ is shifted by one channel bit, with one of the paired traverse information pits $Q_D$, $Q_E$ remaining at the same position, between the adjoining tracks, such that, when reading out the traverse information by the traverse information pits $Q_D$, $Q_E$, the readout errors may be identified readily and the pit pattern of the paired traverse information pits $Q_D$, $Q_E$ can be read out on the basis of the reproduced clocks obtained from the clock information pits $Q_B$ under stable tracking control based on the tracking information pits $Q_A$, $Q_C$ to perform highly accurate traverse count of the recording track on the track-by-track basis.

We claim:

1. A disk-shaped recording medium in which recording tracks forming a large number of circular turns are formed on an annular recording surface section for surrounding a central hole formed in said annular recording surface section, each of said turns of said recording tracks including a predetermined number of recording regions, corresponding ones of said recording regions of said turns of said recording tracks being arrayed in the radial direction of the recording surface section, each of said recording sections including a control recording region and an information writing region consecutive thereto, characterized in that clock information pits arranged on a track center line, a pair of tracking information pits spaced by a predetermined distance from said clock information pits and positioned on the inner and outer sides of said track center line and a pair of traverse information pits spaced by a distance allocated to each of said recording tracks and arranged on said track center line, are provided in said control recording region.

2. The disk-shaped recording medium according to claim 1 characterized in that said clock information pits are arrayed intermediate between said pairs of tracking information pits.

3. The disk-shaped recording medium according to claim 1 characterized in that the relative distance between said paired tracking information pits is changed by one channel bit between adjacent ones of said tracks, with one of the pits being at the same position.

4. The disk-shaped recording medium according to any one of claims 1 to 3 characterized in that said clock information pits, tracking information pits and the traverse information pits are provided as changes in the form of projections and recesses.

5. The disk-shaped recording medium according to any one of claims 1 to 3 characterized in that said clock information pits and said tracking information pits are provided as changes in the form of projections and recesses and said traverse information pits are provided by magneto-optical recording.

6. A disk apparatus for recording/reproducing the information using a disk-shaped recording medium in which recording tracks forming a large number of circular turns are formed on an annular recording surface section for surrounding a central hole formed in said annular recording surface section, each of said turns of said recording tracks including a predetermined number of recording regions, corresponding ones of said recording regions of said turns of said recording tracks being arrayed in the radial direction of the recording surface section each of said recording sections including a control recording region and an information writing region consecutive thereto, wherein clock information pits arranged on a track center line, pairs of tracking information pits each being spaced by a predetermined distance from said clock information pits and positioned on the inner and outer sides of said track center line and pairs of traverse information pits each being spaced by a distance allocated to each of said recording tracks and arranged on said track center line, are provided in said control recording region, characterized in that a the disk apparatus comprises an optical head for reading out said clock information pits, tracking information pits and said traverse information pits, tracking control means for performing tracking control of said optical head relative to said recording track on the basis of the track information of said track information pits read out by said optical head, clock reproducing means for reproducing clocks from the clock information of said clock information pits read out by said optical head under tracking control by said tracking control means, and traverse counting means for reading out the bit pattern of said paired traverse information pits read out by said optical head on the basis of the reproducing clocks reproduced by said clock reproducing means to effect traverse counting of said recording tracks.

* * * * *